April 17, 1934.   W. T. BARRANS ET AL   1,954,979
STRAND ASSEMBLING APPARATUS
Filed March 24, 1930   7 Sheets-Sheet 6
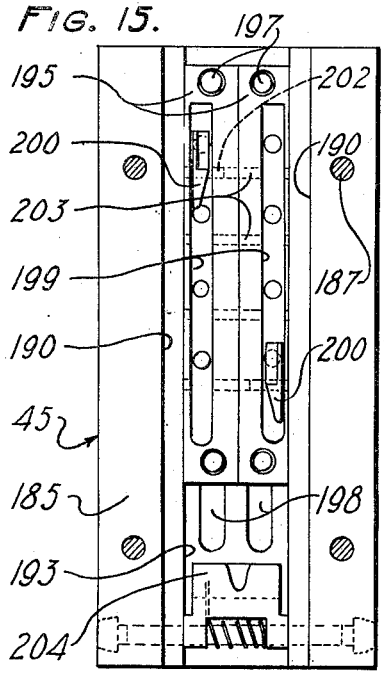
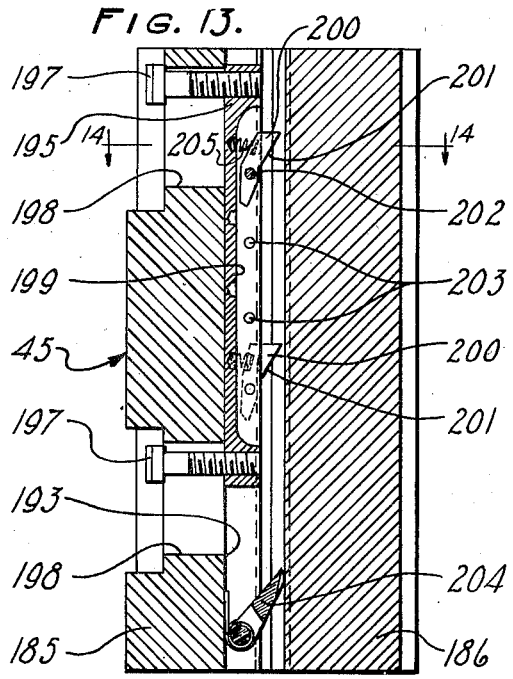
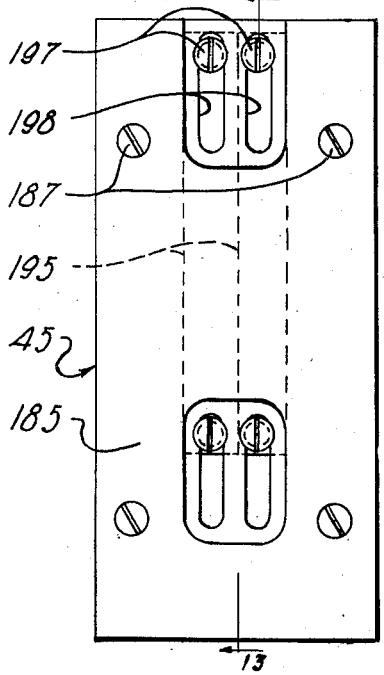
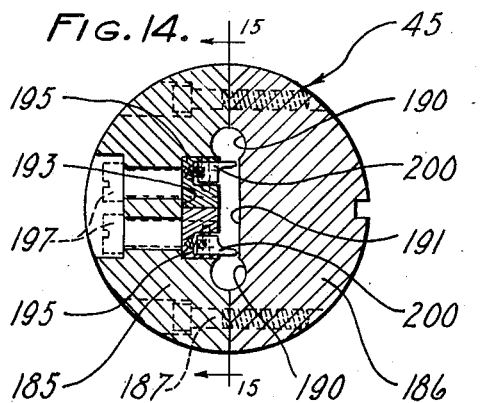
INVENTORS
W. T. BARRANS
B. K. FORD
BY E. R. Nowlan
ATTORNEY April 17, 1934.    W. T. BARRANS ET AL    1,954,979
STRAND ASSEMBLING APPARATUS
Filed March 24, 1930    7 Sheets-Sheet 7
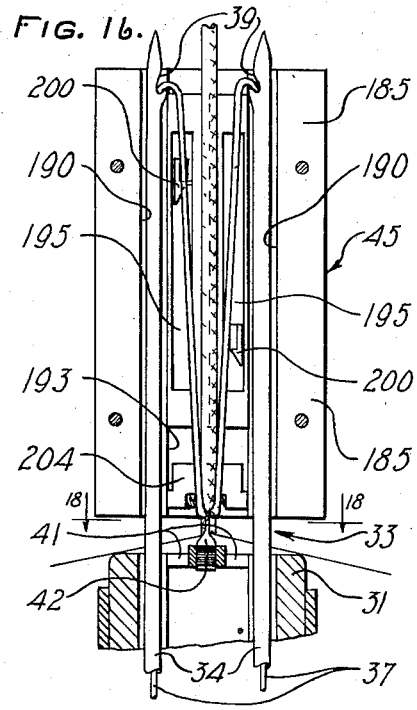
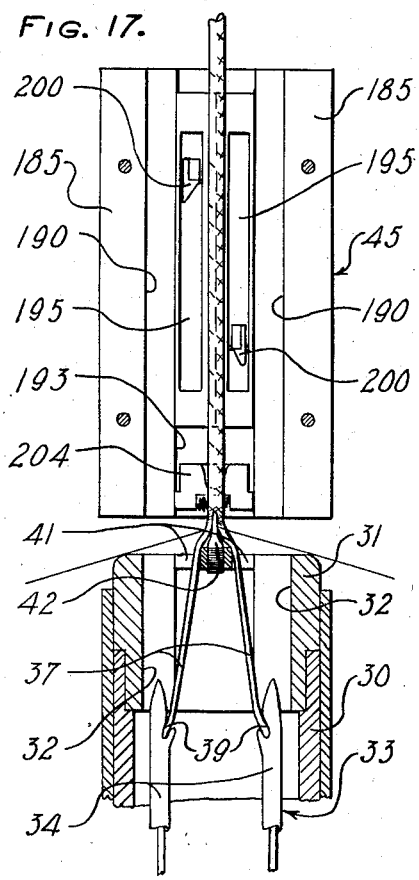
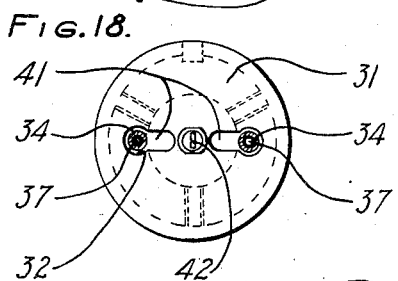
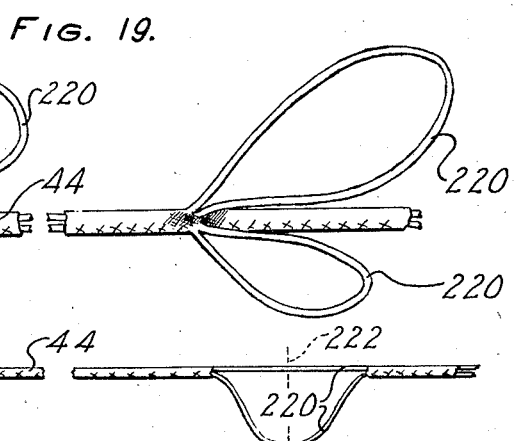
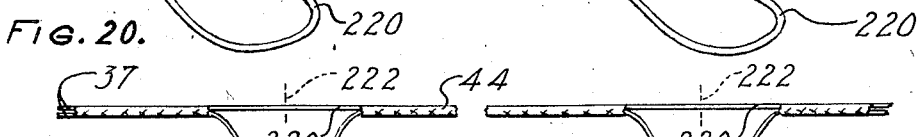
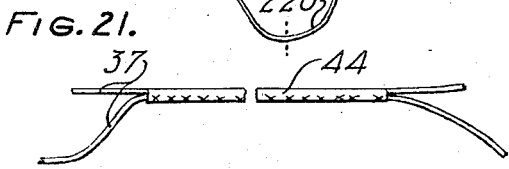
INVENTORS
W. T. BARRANS
B. K. FORD
BY E. R. Nowlan
ATTORNEY Patented Apr. 17, 1934

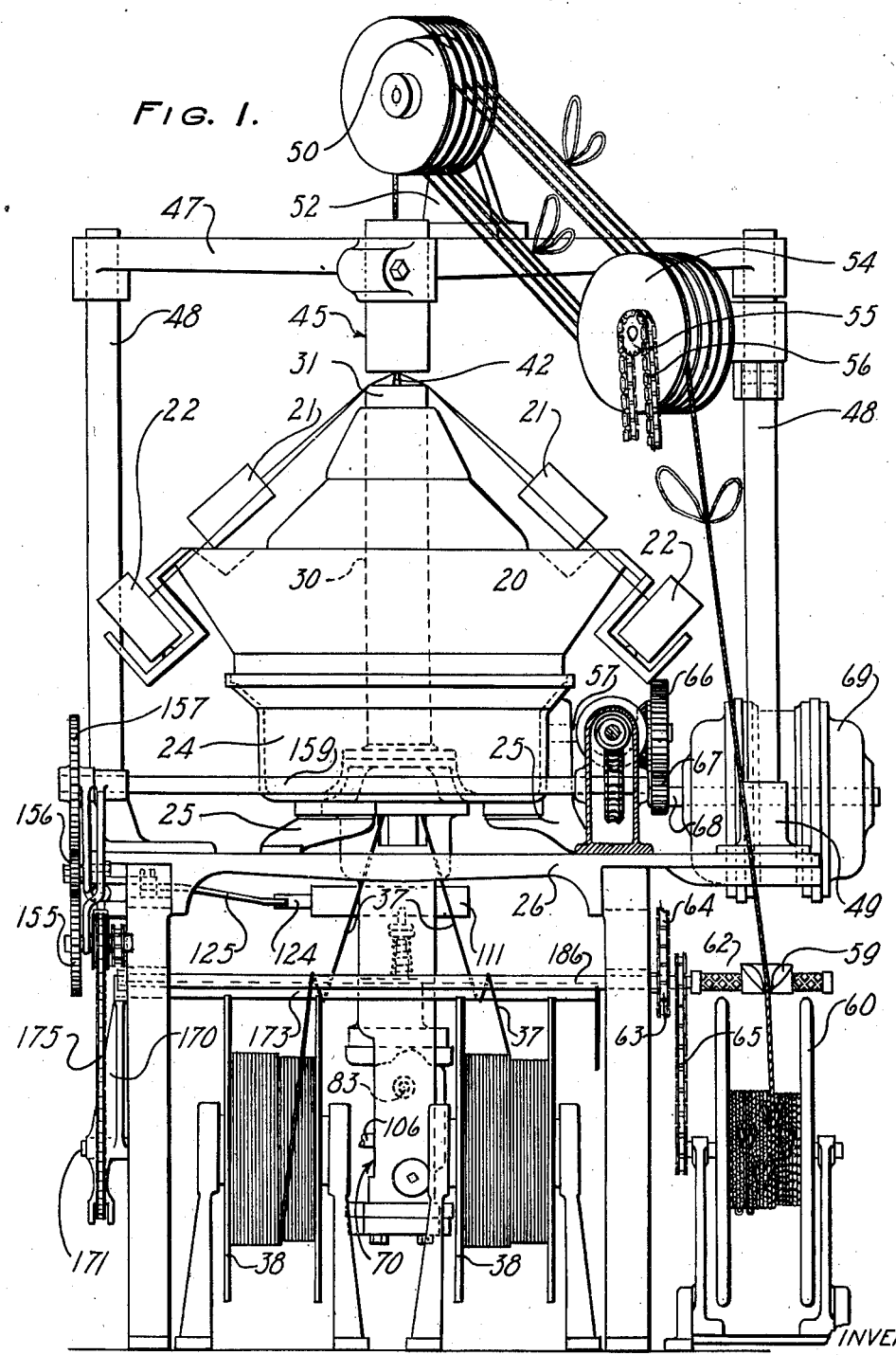

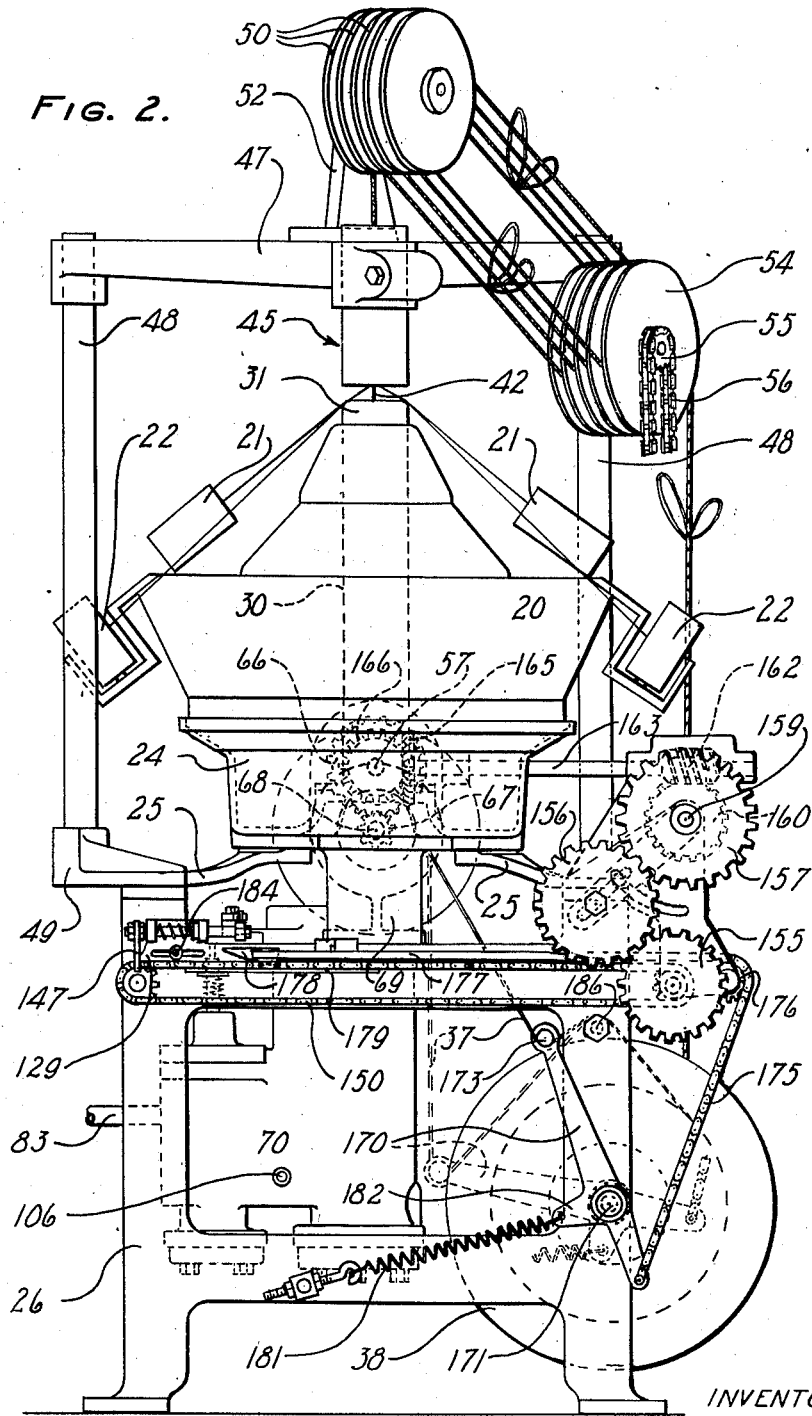

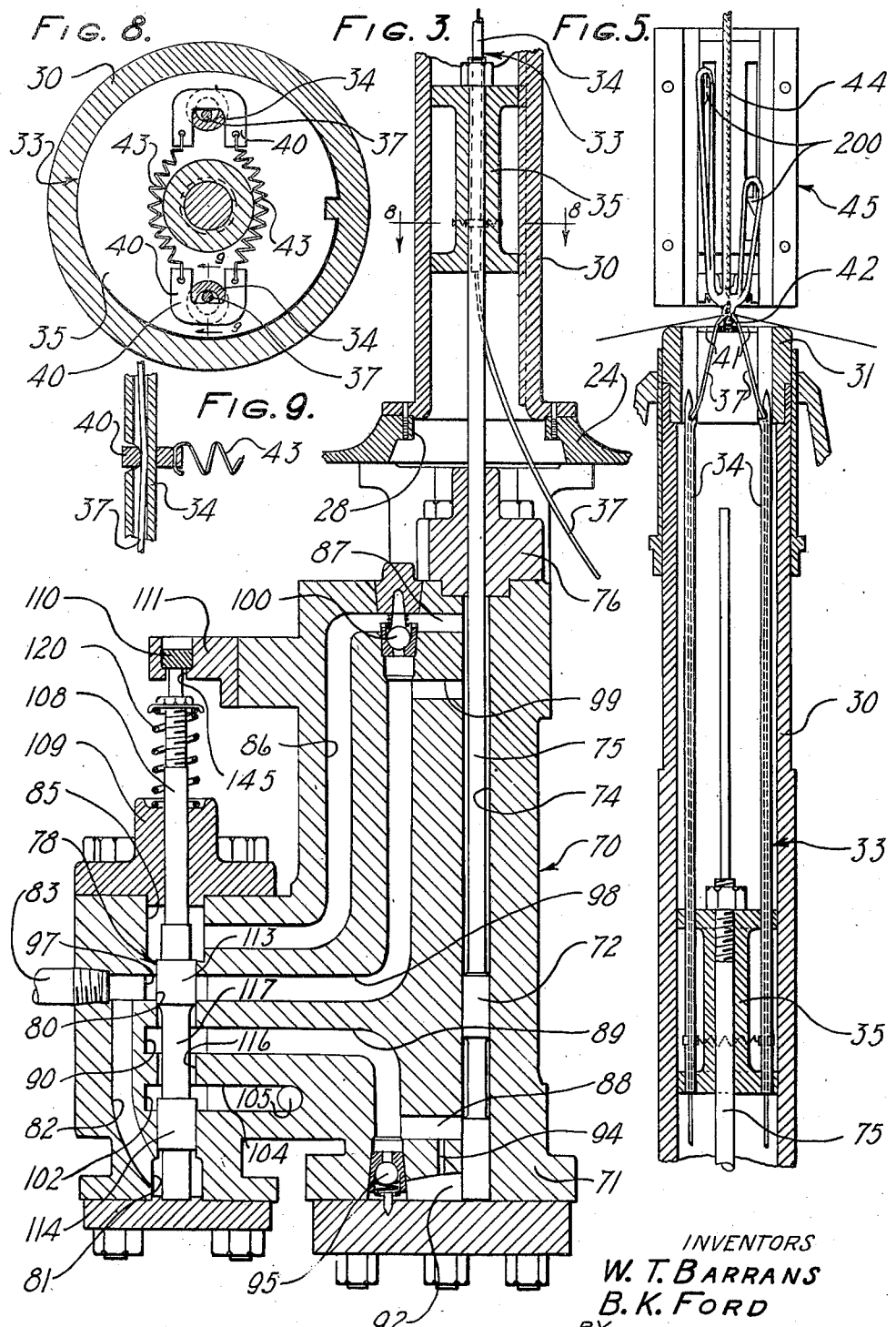

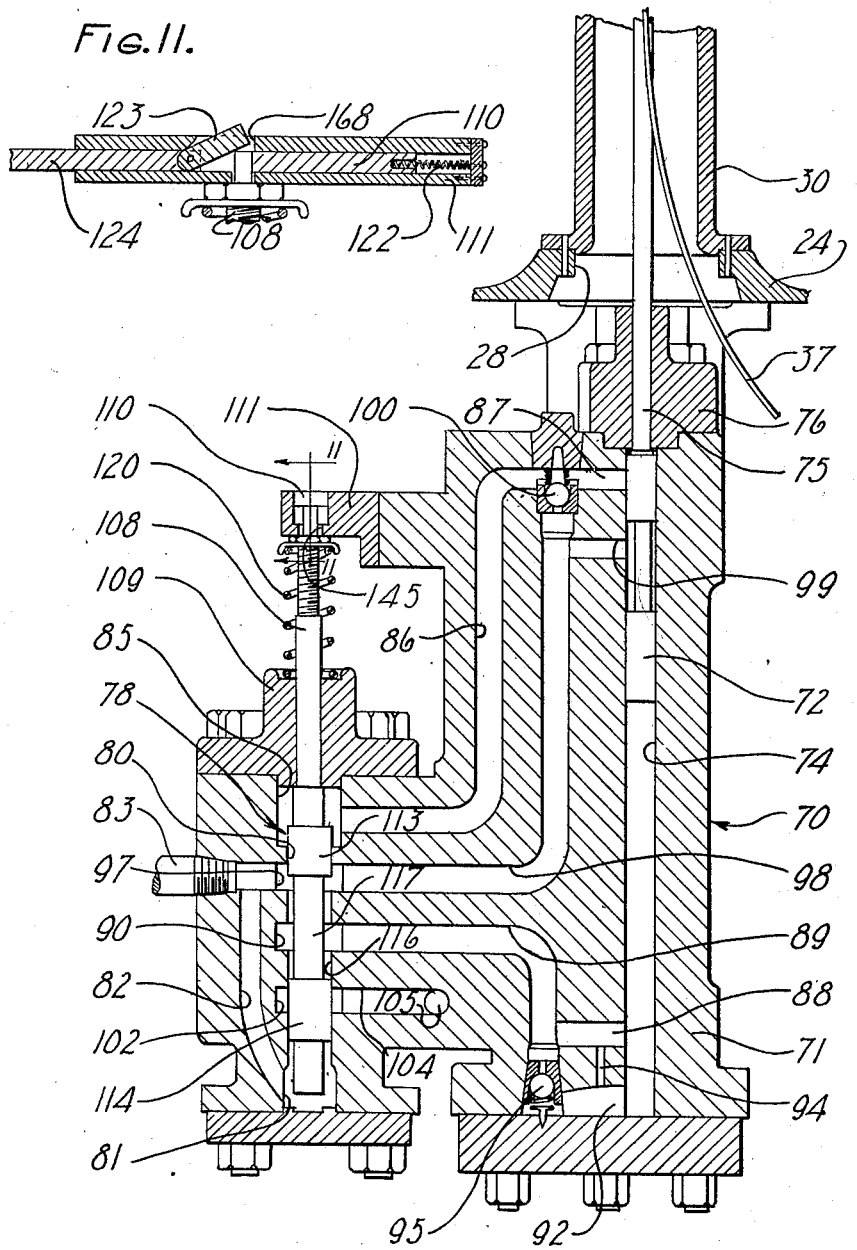

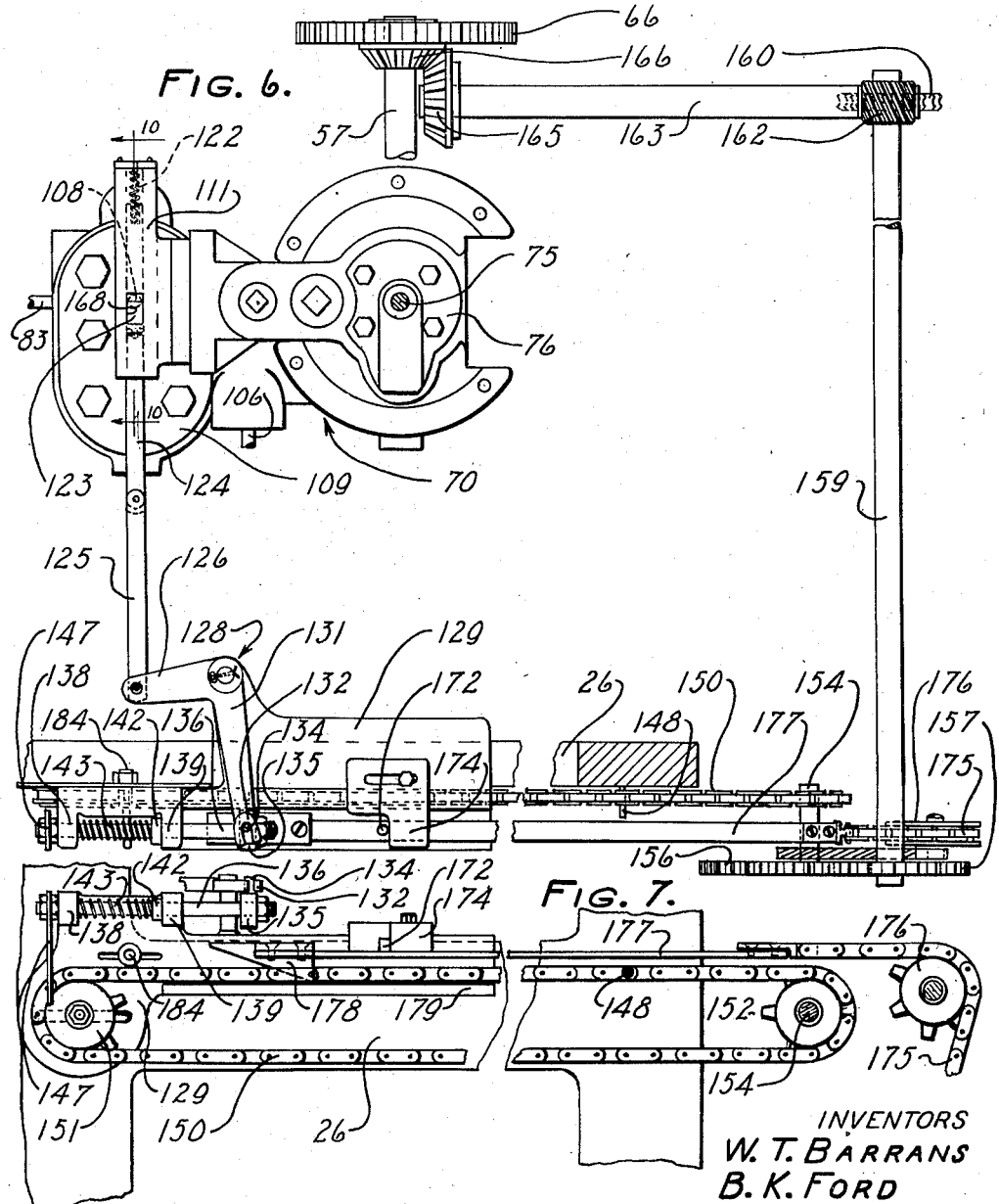

1,954,979

UNITED STATES PATENT OFFICE 1,954,979

STRAND ASSEMBLING APPARATUS

William T. Barrans and Ben K. Ford, Westfield, N. J., assignors to Western Electric Company, Incorporated, New York, N. Y., a corporation of New York Application March 24, 1930, Serial No. 438,266

30 Claims. (Cl. 96—3)

This invention relates to strand assembling apparatus, and more particularly to apparatus for producing multi-conductor cords and the like.

It is desirable in some instances, especially in telephone systems, to employ multi-conductor cords for electrically interconnecting cooperating devices of the system. These cords usually comprise a plurality of individually insulated conductors assembled into a compact unit from the ends of which the individual conductors project suitable lengths to facilitate their connection with the terminals of the associated devices. For convenience in handling these cords in service and in order to reduce the wear upon the insulation of the individual conductors, they are frequently sheathed throughout the greater portion of their length with a common textile covering braided thereover.

The primary object of the present invention is to provide an improved apparatus for producing strand assemblies continuously, rapidly, efficiently, and with a minimum amount of manual labor.

One embodiment of the invention contemplates the provision of an apparatus for producing, in continuous succession from continuous lengths of individually insulated electrical conductors, multi-conductor cords of predetermined lengths covered with braided textile sheaths from which the individual conductors extend predetermined distances. The apparatus includes a braiding head of the usual type by means of which the conductors drawn from individual supplies are assembled into a common sheath or covering braided thereover in a well known manner. A reciprocable conductor elevating mechanism is provided for intermittently elevating predetermined portions of the individual conductors into a chuck positioned above the braiding point, wherein they are supported while the elevating mechanism is returned to its normal position below the braiding point. The conductor elevating mechanism is operated by a quick acting automatically returned fluid operated piston, whereby the conductors are elevated without interrupting the braiding operation. Means is provided for unwinding predetermined lengths of the individual conductors from the supply reels preliminary to each actuation of the conductor elevating mechanism. The elevated portions of the conductors are supported by the chuck above the braiding point as the braiding operation continues, thereby producing a continuous string of braided cords interconnected by unsheathed portions of the individual conductors of predetermined lengths. An adjustable timing means, actuated in synchronism with the braiding operation, is provided for controlling the operation of the conductor elevating mechanism, whereby the lengths of the sheathed portions of the individual cords may be predetermined. The individual cords are subsequently separated by severing the unsheathed portions of the conductors intermediate their ends, thus producing a plurality of individual cords having unsheathed portions of the individual conductors projecting predetermined distances from each end of the braided covering.

It is believed that a clear understanding of the invention will be had from the following detailed description, when taken in conjunction with the accompanying drawings, wherein:

Fig. 1 is a front elevational view, partly in section, of an apparatus embodying the features of the invention, some of the parts being shown schematically in order to more clearly illustrate the novel and important features of the invention;

Fig. 2 is a side elevational view of the apparatus shown in Fig. 1;

Fig. 3 is an enlarged vertical section through the fluid operated reciprocating unit and the lower portion of the conductor elevating mechanism;

Fig. 4 is a vertical section similar to Fig. 3, with the fluid operated piston and control valve thereof shown in their elevated positions;

Fig. 5 is an enlarged vertical section through the upper portion of the conductor elevating mechanism and the chuck for receiving and holding the elevated portions of the conductors;

Fig. 6 is a fragmentary diagrammatic plan view, partly in section, of the timing mechanism for controlling the operation of the reciprocating unit;

Fig. 7 is a fragmentary elevational view, partly in section, of a portion of the structure shown in Fig. 6;

Fig. 8 is an enlarged detailed section on line 8—8 of Fig. 3;

Fig. 9 is an enlarged fragmentary section on line 9—9 of Fig. 8;

Fig. 10 is an enlarged fragmentary section on line 10—10 of Fig. 6;

Fig. 11 is an enlarged fragmentary section on line 11—11 of Fig. 4;

Fig. 12 is an elevational view of the chuck for holding the elevated portions of the conductors;

Fig. 13 is a vertical section on line 13—13 of Fig. 12;

Fig. 14 is a horizontal section on line 14—14 of Fig. 13;

Fig. 15 is a vertical section on line 15—15 of Fig. 14;

Figs. 16 and 17 are enlarged fragmentary sections similar to Fig. 5, which together with Fig. 5, illustrate the several steps in the operation of the conductor elevating mechanism;

Fig. 18 is a detailed section on line 18—18 of Fig. 16;

Fig. 19 shows a plurality of interconnected cords produced by the apparatus of the present invention;

Fig. 20 illustrates the manner in which the cords shown in Fig. 19 are separated and thereafter severed into individual cords; and Fig. 21 is a detailed view of one of the cords after it has been severed from a continuous string thereof.

Referring now to the drawings, wherein like reference numerals designate corresponding parts throughout the several views, it will be observed that the apparatus of the present invention includes a braiding head 20 of any well known type consisting of the usual rotatable carriers for carrying the inner and outer sets of bobbins or cops 21 and 22, respectively, as illustrated diagrammatically in Figs. 1 and 2. The braiding head is mounted in a stationary housing 24 supported by means of brackets 25, 25 upon a suitable supporting framework or pedestal 26.

Attached at its lower end to the housing 24 and communicating with a central circular aperture 28 in the base thereof (Figs. 3 and 4) is a vertical tube 30 which extends upwardly through the center of the braiding head 20 and has a cap 31 attached to the upper end thereof. Slidably mounted within the tube 30 is a conductor elevating mechanism 33, comprising a pair of diametrically opposed tubular needles 34, 34 secured at their lower ends to a cylindrical base member or carrier 35 slidably keyed within the tube 30 (Figs. 5 and 8).

Conductors 37, 37 drawn from rotatable supply reels 38, 38 pass upwardly through the tubular needles 34 from which they emerge through slots 39 (Figs. 16 and 17) provided near the upper ends of the needles. The needles 34 are slotted near their lower ends for accommodating U-shaped members 40—40 which are interconnected by coil springs 43—43 (Figs. 8 and 9) in such manner that the conductors are yieldably pressed by the members against the inner walls of the tubular needles and are thereby restrained against undue displacement therein during the operation of the conductor elevating mechanism. After emerging from the needles the conductors pass upwardly through spaced apertures 41, 41 in the cap 31 and along opposite sides of a tapered pin 42 extending upwardly from the cap. As the conductors pass upwardly along the pin 42, a covering 44 (Fig. 19) is braided thereover in a well known manner by the converging threads from the oppositely rotating supply cops 21 and 22. The pin 42 serves to separate the conductors at the braiding point, whereby a loose covering is reduced which lends flexibility to the finished cords.

The conductors 37 with the covering 44 braided thereover pass upwardly through a cylindrical chuck 45 disposed in axial alignment with the tube 30 and rigidly supported in a horizontal cross beam 47 fixed to the upper ends of vertical posts 48, 48 which extend upwardly from brackets 49, 49 attached to the pedestal 26.

From the chuck 45, hereinafter described in detail, the braided cord passes over the first of a plurality of individually rotatable guide sheaves 50, 50 supported by a bracket 52 secured to the cross beam 47, and then around the first groove of a multi-grooved capstan 54 driven by a sprocket 55 and chain 56 connected in any suitable manner (not shown) to a main drive shaft 57. After passing back and forth around each groove of the capstan 54 and around each of the guide sheaves 50, the cord passes downwardly through a bell-mouthed distributor 59 to a take-up reel 60 (Fig. 1). The distributor 59 is reciprocated in a well known manner to distribute the cord evenly upon the take-up reel, through the rotation of a reversible screw member 62 driven by a sprocket 63 connected by a chain 64 to the main drive shaft 57 in any suitable manner (not shown). The take-up reel may be driven in synchronism with the distributor by a sprocket and chain drive 65 (Fig. 1).

The main drive shaft 57 is suitably journalled in the housing 24 and has a gear 66 keyed thereto by means of which the shaft is driven from a pinion 67 secured to a shaft 68 connected to and driven by an electric motor 69. It will be understood that the thread supply carriers are rotated through suitable gearing (not shown) connected to the main drive shaft 57.

A fluid operated reciprocating unit 70 (Figs. 3 and 4) is provided for imparting a quick reciprocatory motion to the conductor elevating mechanism 33, whereby predetermined lengths of the conductors 37 are elevated past the braiding point and into the chuck 45 by the needles 34 without stopping the braiding operation. This unit comprises a casing 71 positioned below the braiding head 20 and attached to the underside of the housing 24. A fluid operated piston 72 is slidably journalled in a vertical cylinder 74 formed in the casing 71 and has a rod 75 extending upwardly therefrom through a bearing plate 76 secured to the upper end of the casing and through the center of the tube 30. The piston rod 75 is threaded at its upper end whereby it is adjustably secured to the needle carrier 35, in such manner that a reciprocatory motion of the piston 72 produces a corresponding motion of the conductor elevating mechanism 33.

The piston 72 is actuated by fluid under pressure supplied thereto under the control of a slidable valve 78 mounted in a vertical cylinder 80 formed in the casing 71. The valve cylinder 80 is formed at its lower end with a circular recess 81 which communicates through a passage 82 with a fluid pressure line 83 connected to a suitable source (not shown) of oil or other fluid under pressure. An enlarged circular recess 85 formed at the upper end of the valve cylinder is connected by a passage 86 to a port 87 near the upper end of the cylinder 74. A port 88 near the lower end of the cylinder 74 communicates through a passage 89 with an enlarged circular recess 90 formed in the valve cylinder 80 intermediate the upper and lower recesses 85 and 81. A port 92 at the bottom of the cylinder 74 communicates with the passage 89 through a reduced passage 94 and also through a check valve 95, the latter being arranged to permit the passage of fluid under pressure from the passage 89 into the port 92, but prevent the passage of the fluid in the opposite direction. A recess 97 formed in the valve cylinder 80 between the upper recess 85 and the intermediate recess 90 communicates through a passage 98 with a port 99 in the upper portion of the cylinder 74 slightly below the port 87. The passages 86 and 98 are interconnected by a check valve 100 arranged to permit the passage of the operating fluid from the passage 98 into the passage 86, but prevent the passage of the fluid in the opposite direction. A circular recess 102 formed in the valve cylinder 80 between the lower recess 81 and the intermediate recess 90 communicates through a passage 104 with a return port 105 connected to a return line 106 (Fig. 1).

The valve 78 is provided with a reduced stem 108 which extends upwardly through a bearing plate 109 attached to the casing 71. The upper end of the valve stem 108 normally engages a slidable stop plate or latch 110 mounted in a bracket 111 secured to the casing 71. The valve 78 is formed with spaced portions 113 and 114 of enlarged circular cross section designed for a tight sliding fit in the valve cylinder 80, and positioned so as to selectively control the passage of the operating fluid from the compressed fluid line 83 into the upper and lower ends of the cylinder 74.

The operation of the above described reciprocating unit 70 is as follows: A constant upward pressure is maintained upon the lower end of the valve 78 through the passage 82 and the recess 81 (Fig. 3). Also, a constant downward pressure is maintained upon the upper end of the valve through the recess 97, passage 98, check valve 100, passage 86, and recess 85. However, since the effective downward pressure area at the upper end of the valve is less than that at the lower end of the valve by an amount corresponding to the cross sectional area of the valve stem 108, it will be obvious that a resulting upward pressure is maintained. The slidable latch 110 serves to normally hold the valve downwardly, as shown in Fig. 3, against this upward pressure of the fluid. With the valve in this position, the enlarged portion 113 thereof closes the valve cylinder recess 97 to the recess 90 of the valve cylinder, while the enlarged portion 114 of the valve is positioned so that the recess 102 communicates with the recess 90 through a cylindrical passage 116 surrounding a reduced portion 117 of the valve. Thus, it will be apparent that the upper end of the cylinder 74 is open to the fluid pressure line 83 through the port 99, passage 98 and valve cylinder recess 97, while the lower end of the cylinder 74 is closed to the pressure line by the enlarged portion 113 of the valve, but open to the return line 106 through the ports 88 and 92, passage 89, valve cylinder recess 90, passage 116, recess 102, passage 104 and return port 105. A downward pressure is thus maintained in the cylinder 74 which holds the piston 72 downwardly, as shown in Fig. 3.

When the latch 110 is moved out of operative engagement with the valve stem 108, the valve 78 is instantaneously moved upwardly, under the pressure of the fluid, to the position shown in Fig. 4. If desired, a coil spring 120 may be provided for moving the valve upwardly. With the valve in this position, the enlarged portion 114 thereof closes the valve cylinder recess 102 to the recess 90 of the valve, while the enlarged portion 113 of the valve is positioned so that the recess 90 communicates with the recess 97 through the cylindrical passage 116. Thus, it will be seen that the lower end of the cylinder 74 is now closed to the return line 106 by the enlarged portion 114 of the valve, but open to the pressure line 83 through ports 88 and 92, passage 89, valve cylinder recess 90, passage 116, and recess 97. The upper end of the cylinder 74 remains open to the pressure line, but since the effective downward pressure area of the upper end of the piston is less than that of the lower end of the piston by an amount corresponding to the cross sectional area of the piston rod 75, it will be obvious that a resulting upward pressure is introduced in the cylinder 74, which moves the piston upwardly to the position shown in Fig. 4.

Upon approaching the upper end of the cylinder 74, the upper portion of the piston 72 closes the port 99 and as it thereafter continues its upward movement, the pressure in the upper end of the cylinder is increased considerably due to the fact that the effective pressure area above the piston is less than the effective pressure area below the piston. This increased pressure is transmitted through the port 87, passage 86, and valve cylinder recess 85 to the upper end of the valve 78, and is sufficient to overcome the upward pressure of valve spring 120, as well as the upward fluid pressure on the bottom of the valve, due to the ratio of the effective pressure area below the piston 72 to that above the piston being greater than the ratio of the effective pressure area below the valve 78 to that above the valve by an amount sufficient to overcome the upward pressure of the valve spring 120. Thus, the valve is automatically returned to its normal downward position shown in Fig. 3, after which the piston 72 is moved downwardly in the manner hereinbefore described. As the piston moves downwardly, a portion of the fluid is forced through the small passage 94, which provides a dash pot effect for cushioning the downward stroke of the piston.

Mechanism is provided for intermittently disengaging the valve control latch 110 in synchronism with the braiding operation, whereby cords of a predetermined length are produced. The latch 110 is constantly pressed by a coil spring 122 (Fig. 10) against one end of a detent 123 which is pivoted at its opposite end to a horizontal bar 124 slidable in the bracket 111 and connected by a link 125 to an arm 126 of a bell crank lever 128 pivotally supported by a bracket 129 secured to the pedestal 26 (Fig. 6). Another arm 131 of the bell crank lever 128 terminates in a bifurcated portion 132 which straddles a pin 134 projecting from a collar 135 secured to a rod 136 slidable in spaced ear portions 138 and 139 of the bracket 129. A collar 142 is secured to the rod 136 between the ear portions 138 and 139, and a coil spring 143 interposed between the collar 142 and ear portions 138 serves to normally hold the collar against the ear portion 139. The arrangement just described is such that the end of the latch 110 normally engages the upper end of the valve stem 108 which projects through an aperture 145 in the bracket 111, as shown in Fig. 10.

Depending from the outer end of the rod 136 is an arm 147 (Fig. 7) arranged to be engaged at predetermined intervals by a pin 148 carried by a continuously moving endless chain 150. The chain 150 travels around a pair of spaced sprockets 151 and 152, the sprocket 152 being secured to a shaft 154 having a gear 155 affixed thereto (Figs. 1 and 2) by which it is driven through an intermediate change gear 156 from a gear 157 keyed to one end of a horizontal shaft 159. A worm gear 160 secured to the opposite end of the shaft 159 (Figs. 1 and 6) is driven by a worm 162 carried upon one end of a shaft 163 which has keyed to its other end a bevel gear 165 driven by a bevel gear 166 keyed to the main drive shaft 57. From the construction just described, it will be obvious that the 150 chain 150 is driven in synchronism with the braiding head. It will also be noted that the pin 148 carried by the chain 150 is adapted to move the depending arm 147 and thereby the rod 136 to the left (Fig. 7) against the tension of the spring 143, as the chain link which carries the pin passes over the top of the idler sprocket 151. This movement of the rod 136 is transmitted through the bell crank lever 128 and link 125 to produce a corresponding movement of the bar 124 and the pivoted detent 123 in the direction indicated by the arrows (Fig. 10), thereby moving the spring pressed latch 110 out of engagement with the valve stem 108 as shown in Fig. 11, whereupon the valve 78 is moved upwardly by the fluid under pressure or by spring 120, or both, to the position shown in Fig. 4, thus causing the piston 72 and thereby the conductor elevating mechanism 33 to be moved upwardly. As the valve 78 moves upwardly, the pivoted detent 123 is swung upwardly by the valve stem through a slot 168 in the bracket 111, whereby it is disengaged from the latch 110, as shown in Fig. 11.

The valve 78 is returned to its normal downward position by the fluid under pressure in the manner herein before described and is latched in this position by the spring pressed latch 110 which acts before the pivoted detent 123 drops to its normal position. As the sprocket chain 150 continues its movement around the sprocket 151 the pin 148 is automatically disengaged from the depending arm 147 which is returned to normal position by spring 143 and allows the pivoted detent 123 to drop to its normal position.

Means is provided for unwinding predetermined lengths of the conductors 37 from the supply reels 38 preliminary to each reciprocation of the conductor elevating mechanism 33. This means comprises a member 170 (Fig. 2), pivoted intermediate its ends upon a pin 171 secured to the pedestal 26 and disposed in axial alignment with the axes of the supply reels. One end of the member 170 extends beyond the peripheries of the supply reels and has a bar 173 attached thereto which is parallel to the axes of the supply reels and spaced from the peripheries thereof. The opposite end of the member 170 is attached to one end of a chain 175 adapted to travel over an idler sprocket 176 and fastened at its opposite end to a horizontal bar 177 (Figs. 6 and 7). A pin 172 secured to the bar 177 is adapted to engage an adjustable stop 174 secured to the braket 129 for limiting the movement of the pivoted member 170 in a clockwise direction (Fig. 2). Carried upon the outer end of the bar 177 is a tapered cam member 178 which is slidable upon a shelf 179 which extends from the bracket 129 and also serves as a support for the upper portion of the chain 150. The cam member 178 is positioned in the path of the pin 148 carried by the endless chain 150.

By referring to Figs. 2 and 7, it will be observed that the bar 177 is moved to the left upon the engagement of the pin 148 with the cam member 178, which movement is transmitted through the chain 175 to rotate the pivoted member 170 in a counter-clockwise direction (Fig. 2) against the action of a coil spring 181 attached at one end to the pedestal 26 and secured at its opposite end to an arm 182 extending from the pivoted member. As the member 170 approaches the dotted line position shown in Fig. 2, the tapered cam member 178 rides over a stationary pin 184, adjustably secured to the bracket 129, whereby the cam member is disengaged from the pin 148, whereupon the pivoted member 170 is returned to its normal position by the spring 181. It will be noted that the stationary pin 184 is positioned so as to disengage the cam member 178 from the pin 148 before the latter pin engages the depending arm 147 to cause the operation of the conductor elevating mechanism.

The conductors 37 pass from the supplies over a fixed horizontal bar 186 mounted in the pedestal 26, then under the bar 173 carried by the pivoted member 170, and then through the tubular needles 34 as hereinbefore described. Upon the rotation of the member 170 in a counter-clockwise direction (Fig. 2), it will be obvious that predetermined lengths of the conductors are unwound from the supplies by the bar 173, in accordance with the relative positions of the adjustable pin 184 and stop 174. Thus, the conductors are not subjected to deleterious tensional strains when elevated into the chuck 45 by the conductor elevating mechanism hereinbefore described.

The chuck 45 comprises complementary sections 185 and 186 of semi-circular cross section and fastened together by means of a plurality of screws 187, 187 (Figs. 13 and 14). The adjoining faces of the sections 185 and 186 are formed with complementary longitudinal recesses which extend throughout the entire length of the chuck and cooperate to provide spaced vertical passages 190, 190 of circular cross section and interconnected by a central rectangular passage 191 (Fig. 14), the circular passages 190 being adapted to slidably accommodate the conductor elevating needles 34, as shown in Fig. 16. The section 185 of the chuck is provided with a rectangular slot or recess 193, which opens into the central rectangular passage 191 and extends throughout the entire length thereof. The recess 193 is adapted to slidably accommodate a pair of vertical bars 195, 195 of rectangular cross section which are secured in position by means of clamping bolts 197, 197. The bolts extend through elongated vertical slots 198, 198 in the section 185 of the chuck whereby the bars 195 may be adjusted vertically with respect to the supporting section 185. The bars 195 are provided with vertical slots 199, 199 (Fig. 15), which communicate with the central passage 191 of the chuck. A conductor gripping finger 200 is pivotally mounted intermediate its ends in the slot 199 of each of the bars 195, by means of a pin 202 adapted to be inserted in any one of a plurality of vertically spaced apertures 203, 203 provided in the bars 195, whereby the fingers 200 may be vertically adjusted with respect to the bars 195. The upper ends of the gripping fingers are yieldably projected into the central passage 191 of the chuck by means of coil springs 205, 205 interposed between the fingers and the bottom of the slots 199. The lower ends of the fingers 200 are designed to engage the bottom of the slots 199 to thereby limit the outward movement of the upper ends of the fingers.

Upon being elevated the conductors pass between the holding fingers 200 and the opposite wall of the central passage 191 of the chuck, the upper ends of holding fingers being moved toward the supporting bars 195 through the engagement of the conductors with an inclined edge 201 (Fig. 13) of the fingers, to thereby permit the passage of the conductors. As the conductors pass the holding fingers 200 the springs 205 return the fingers 200 to their normal position. During the downward movement of the needles 34 the conductors are pulled taut over the horizontal upper edges of the holding fingers, as shown in Figure 5, by the action of the U-shaped members 40 in restraining the movement of the conductor through the needles 34.

The braided cord is drawn upwardly by the capstan 54 through the center of the central passage 191 of the chuck. Pivoted in the lower portion of the recess 193 of the chuck is a spring pressed member 204 which yieldably presses the cord against the opposite wall of the central passage 191 to thereby prevent displacement of the cord during the operations of the conductor elevating mechanism.

The operation of the above described apparatus is as follows: The sheath or covering 44 is braided around the continuously moving conductors 37 in the usual manner, the braided cord being drawn by the capstan 54 through the central passage 191 of the chuck 45. The conductor elevating mechanism 33 is normally positioned so that the upper ends of the needles 34 are disposed below the braiding point, as shown in Fig. 17. At predetermined intervals, predetermined amounts of the individual conductors are unwound from the supply reels through the movement of the member 170 in a counter-clockwise direction (Fig. 2) in the manner hereinbefore described, after which the conductor elevating mechanism is actuated through one complete reciprocation by the automatically returned fluid operated piston 72. During the upward movement of the conductor elevating mechanism, the needles 34 are elevated through the cylindrical guide passages 32 and 190 of the cap 31 and chuck 45, respectively, to the positions shown in Fig. 16, whereby the conductor portions previously unwound from the supply reels are drawn upwardly through the tubular needles, emerging therefrom through the slots 39 in the upper ends of the needles. The conductor portions emerging from the upper ends of the needles are elevated into the central passage 191 of the chuck 45, as shown in Fig. 16. Upon the downward movement of the needles 34, the elevated portions of the conductors are looped tightly around the gripping fingers 200 of the chuck, as shown in Fig. 5, and as the braiding operation continues, these unsheathed looped portions of the conductors are carried upwardly with the braided cord.

The time required by the reciprocating unit to complete one cycle of operation is about one-tenth of a second, and therefore the operation of the conductor elevating mechanism does not interfere with the braiding operation. For example, with the braiding head rotating at a speed of 120 R. P. M., the conductor elevating mechanism completes one cycle of the operation during the time required for the braiding head to make ⅕ of a revolution. Furthermore, since the diametrically opposed elevating needles 34 are positioned relatively close to the axis of the braiding head, the round pointed upper ends of the needles move upwardly through the converging threads without displacing the threads appreciably, and it will be understood that any momentary slight displacement of the threads by the conductor elevating needles is compensated for by the usual tension controlling devices employed with the thread supply bobbins. Thus, a continuous string of braided cords of a predetermined length is continuously produced by the apparatus, the individual cords being interconnected by unsheathed loop portions 220 of the individual conductors, as shown in Fig. 19. The individual cords are subsequently separated by severing the interconnecting braiding threads, and thereafter severing the unsheathed conductor portion 220 intermediate their ends as indicated by the dotted lines 222 in Fig. 20, thus producing a plurality of individual cords having unsheathed portions of the individual conductors projecting predetermined distances from each end of the braided covering, as shown in Fig. 21.

It will be obvious that the lengths of the projecting end portions of the conductors may be varied by changing the relative positions of the gripping fingers 200 with respect to their supporting bars 195, and also by vertically adjusting the supporting bars 195. Also, that the length of cord may be varied by changing the ratio of the gears 157 and 155 and the number of picks per inch may be varied by changing the diameter of the capstan 54.

Although the invention is herein illustrated and described in conjunction with an apparatus for producing multi-conductor cords of the type employed in telephone systems, it is to be understood that the invention is capable of numerous other applications within the scope of the appended claims.

What is claimed is:

1. In an apparatus for assembling strands, means for applying a common covering upon a plurality of strands, and means operable without interrupting the application of the covering to the strands for intermittently moving the strands with respect to the cover applying means whereby portions of the strands remain uncovered.

2. In an apparatus for assembling strands, means for applying a covering upon a plurality of strands, means for advancing the strands vertically to a cover applying position, and means for intermittently elevating predetermined portions of the strands beyond the cover applying position without interrupting the operation of the cover applying means, whereby portions of the strands remain uncovered.

3. In an apparatus for assembling strands, means for applying a common covering upon a plurality of strands, means for continuously moving the strands with respect to the cover applying means, and fluid operated means operable without interrupting the application of the covering to the strands by the cover applying means for temporarily accelerating the movement of the strands, whereby certain portions of the strands remain uncovered.

4. In an apparatus for assembling strands, means for applying a common covering upon a plurality of strands, means for continuously advancing the strands through the cover applying means, tubular elements for guiding the strands to the cover applying means, and means for reciprocating the tubular elements to accelerate the movement of the strands without interrupting the operation of the cover applying means.

5. In an apparatus for assembling strands, means for applying a common covering upon a plurality of strands, means for continuously advancing the strands through the cover applying means, tubular elements for guiding the strands to the cover applying means, and fluid operated means for intermittently reciprocating the tubular elements to elevate the strands beyond the cover applying means without interrupting the operation of the cover applying means.

6. In an apparatus for covering strands, means for applying a covering upon a strand, and means operable without interrupting the application of the covering to the strand for moving a portion of the strand with respect to the cover applying means, whereby said portion of the strand remains uncovered.

7. In an apparatus for covering a strand, means for applying a covering upon a strand, and fluid actuated means operable without interrupting the application of the covering to the strand by the cover applying means for intermittently elevating portions of the strand whereby spaced portions of the strand remain uncovered.

8. In an apparatus for covering strands, means for moving a strand, means effective at a point along the path of the moving strand for applying a covering to the strand, and means operable without interrupting the application of the covering to the strand by the last mentioned means for carrying a portion of the strand beyond the point of the application of the covering, whereby said portion of the strand remains uncovered.

9. In an apparatus for assembling strands, means for applying a common covering upon a plurality of strands, means for continuously moving the strands with respect to the cover applying means, and means operable without interrupting the application of the covering to the strand by the cover applying means for intermittently changing the rate of the movement of the strand, whereby certain portions of the strand remain uncovered.

10. In an apparatus for covering strands, means for applying a covering upon a strand, and means operable without interrupting the application of the covering to the strand for moving the strand with respect to the cover applying means to form a loop in the strand at a predetermined point therealong with the ends of the loop interconnected by the cover applying means.

11. In an apparatus for assembling strands, means for applying a common covering upon a plurality of strands, fluid operated means operable without interrupting the application of the covering to the strand by the cover applying means for intermittently moving predetermined portions of the strands beyond the cover applying means whereby said portions of the strands remain uncovered, and means actuated in synchronism with the cover applying means for controlling the operation of the fluid operated means.

12. In an apparatus for assembling strands, means for applying a common covering upon a plurality of strands, fluid operated means for intermittently moving predetermined portions of the strands beyond the cover applying means without interrupting the operation of the cover applying means, and an automatically returned slidable valve for controlling the supply of the operating fluid to the fluid operated means.

13. In an apparatus for assembling strands, means for applying a common covering upon a plurality of strands, fluid operated means for intermittently moving predetermined portions of the strands beyond the cover applying means without interrupting the operation of the cover applying means, an automatically returned slidable valve for controlling the supply of the operating fluid to the fluid operated means, and means actuated in synchronism with the cover applying means for controlling the operation of the valve.

14. In an apparatus for covering strands, means for braiding a covering upon a strand, and means for intermittently advancing the strand with respect to the braiding means during the application of the covering to the strand by the braiding means whereby spaced portions of the strand remain uncovered.

15. In an apparatus for covering strands, means for braiding a covering upon a strand, means for intermittently advancing the strand with respect to the braiding means during the application of the covering to the strand by the braiding means whereby spaced portions of the strand remain uncovered, and means actuated in synchronism with the braiding means for controlling the operation of the strand advancing means.

16. In an apparatus for covering strands, means for applying a common covering upon a plurality of strands, and means for intermittently moving portions of certain of the strands with respect to the cover applying means without interrupting the application of the covering to the strands by the cover applying means, whereby said portions remain uncovered.

17. In an apparatus for covering strands, means for applying a covering upon a strand, fluid operated means for moving a portion of the strand with respect to the cover applying means without interrupting the application of the covering to the strand by the cover applying means whereby said portion of the strand remains uncovered, and an automatically returned valve for controlling the fluid operated means.

18. In an apparatus for covering strands, means for applying a covering upon a strand, fluid operated means for intermittently moving predetermined portions of the strand with respect to the cover applying means without interrupting the application of the covering to the strand by the cover applying means, and an automatically returned fluid actuated valve for controlling the fluid operated means.

19. In a braiding machine the combination of two oppositely rotating sets of thread-supplies cooperating to braid a tubular covering upon a wire, and fluid actuated wire looping means intermittently operable to form and project looped portions of the wire between the threads supplied from said sets during continuous rotation thereof.

20. In a braiding machine the combination of two oppositely rotating sets of thread-supplies cooperating to braid a tubular covering upon a wire, reciprocable means operable upon the wire to form and project looped portions thereof between the threads supplied from said sets, and means for advancing and retracting said reciprocable means with sufficient promptness to project said looped portions between said threads during continuous rotation of said sets.

21. In a braiding machine the combination of two oppositely rotating sets of thread-supplies cooperating to braid a tubular covering upon a wire, reciprocable means operable upon the wire to form and project looped portions thereof between the threads supplied from said sets, and fluid actuated thrust mechanism for actuating said reciprocable means.

22. In a braiding machine the combination of two oppositely rotating sets of thread-supplies cooperating to braid a tubular covering upon a wire, reciprocable means operable upon the wire to form and project looped portions thereof between the threads supplied from said sets, a piston and cylinder for actuating said reciprocable means, a fluid pressure source, and valve mechanism for controlling and automatically reversing the action of said piston and cylinder.

23. In an apparatus for covering strands, means for applying a covering upon a strand, and fluid actuated means operable without interrupting the application of the covering to the strand by the cover applying means for intermittently advancing portions of the strand whereby spaced portions of the strand remain uncovered, said last named means including means for automatically reversing the direction of motion thereof at the end of each intermittent advance of the strand.

24. In a strand covering machine having means for applying a cover onto a strand, the combination of fluid actuated reciprocable means operable without interrupting the application of the covering to the strand by the cover applying means for intermittently advancing portions of the strand whereby spaced portions of the strand remain uncovered, and means automatically operable to effect prompt reversal of movement of said fluid actuated means at the end of each intermittent advance of the strand.

25. In an apparatus for covering strands, means for applying a common covering upon a plurality of strands and fluid operated means for intermittently moving predetermined portions of the strands beyond the cover applying means without interrupting the operation of the cover applying means comprising a piston and cylinder, a control valve and means actuated by fluid discharge from the cylinder for operating the valve.

26. In an apparatus for covering strands, means for applying a common covering upon a plurality of strands, a fluid operated reciprocable member for intermittently moving predetermined portions of the strands beyond the cover applying means without interrupting the operation of the cover applying means, a piston and cylinder for driving the reciprocable member and a valve actuated by fluid discharge from the cylinder for reversing the reciprocable member.

27. In an apparatus for covering strands, means for applying a common covering upon a plurality of strands, a fluid operated reciprocable member for intermittently moving predetermined portions of the strands beyond the cover applying means without interrupting the operation of the cover applying means, a piston and cylinder for operating the reciprocable member, a fluid pressure source, a piston controlled port in the cylinder through which the pressure source normally communicates with one end of the cylinder, a valve controlling communication between the pressure source and the opposite end of the cylinder to control the operation of the reciprocable member and fluid pressure actuated means connected with the first mentioned end of the cylinder for actuating the valve upon closure of the piston controlled port.

28. In an apparatus for covering strands, means for applying a common covering upon a plurality of strands, a fluid operated reciprocable member for intermittently moving predetermined portions of the strands beyond the cover applying means without interrupting the operation of the cover applying means, a piston and cylinder for operating the reciprocable member, a fluid pressure source, a control valve, means for yieldably urging the valve in one direction, means for releasably retaining said valve to inactive position against the influence of the yieldable means, means for releasing the retaining means to permit movement of the valve and thereby effect movement of the reciprocable member in one direction and means controlled by the movement of the reciprocable member for returning the valve to inactive position.

29. In an apparatus for covering strands, means for applying a common covering upon a plurality of strands, a fluid operated reciprocable member for intermittently moving predetermined portions of the strands beyond the cover applying means without interrupting the operation of the cover applying means, a piston and cylinder for actuating the reciprocable member, yieldable means for urging the valve in one direction, latch mechanism for releasably retaining the valve in inactive position against the influence of the yieldable means, means for releasing the latch mechanism to shift the valve and render the piston active, means controlled by the piston for trapping liquid in the cylinder and means actuated by the trapped liquid for returning the valve to its inactive position.

30. In an apparatus for covering strands, means for applying a common covering upon a plurality of strands, a fluid operated reciprocable member for intermittently moving predetermined portions of the strands beyond the cover applying means without interrupting the operation of the cover applying means, a piston and cylinder for operating the reciprocable member, a fluid pressure source, a control valve between the source and cylinder, means for shifting the valve in one direction, means for trapping fluid in one end of the cylinder upon movement of the member to a predetermined point in one direction, and fluid actuated means permanently connected with the cylinder for shifting the valve in the opposite direction under the increased pressure of the trapped fluid.

WILLIAM T. BARRANS.
BEN K. FORD.